United States Patent
Purushothaman

(10) Patent No.: US 9,277,422 B2
(45) Date of Patent: Mar. 1, 2016

(54) DYNAMIC SELF CONFIGURATION ENGINE FOR COGNITIVE NETWORKS AND NETWORKED DEVICES

(75) Inventor: Balamuralidhar Purushothaman, Karnataka (IN)

(73) Assignee: Tata Consultancy Services Limited, Maharashtra (IN)

(*) Notice: Subject to any disclaimer, the term of this patent is extended or adjusted under 35 U.S.C. 154(b) by 444 days.

(21) Appl. No.: 13/372,636

(22) Filed: Feb. 14, 2012

(65) Prior Publication Data
US 2012/0209582 A1      Aug. 16, 2012

(30) Foreign Application Priority Data
Feb. 15, 2011  (IN) ............................ 420/MUM/2011

(51) Int. Cl.
| | |
|---|---|
| *H04W 16/22* | (2009.01) |
| *H04W 24/00* | (2009.01) |
| *H04W 24/02* | (2009.01) |
| *G06K 9/62* | (2006.01) |
| *H04W 40/12* | (2009.01) |
| *H04W 40/18* | (2009.01) |
| *G06N 5/02* | (2006.01) |

(52) U.S. Cl.
CPC ............. *H04W 24/02* (2013.01); *G06K 9/6296* (2013.01); *G06N 5/02* (2013.01); *H04W 40/12* (2013.01); *H04W 40/18* (2013.01)

(58) Field of Classification Search
None
See application file for complete search history.

(56) References Cited

U.S. PATENT DOCUMENTS

| | | | | |
|---|---|---|---|---|
| 5,251,144 | A  * | 10/1993 | Ramamurthi | 700/177 |
| 5,784,557 | A  * | 7/1998 | Oprescu | 709/220 |
| 6,690,652 | B1 * | 2/2004 | Sadri | 370/252 |
| 7,991,722 | B1 * | 8/2011 | Hintz | 706/45 |
| 2002/0075270 | A1 * | 6/2002 | Alden et al. | 345/473 |
| 2004/0111197 | A1 * | 6/2004 | Kipersztok et al. | 701/29 |
| 2005/0234973 | A1 * | 10/2005 | Zeng et al. | 707/103 R |
| 2005/0265321 | A1 * | 12/2005 | Rappaport et al. | 370/352 |
| 2007/0222576 | A1 * | 9/2007 | Miller et al. | 340/506 |
| 2008/0039089 | A1 * | 2/2008 | Berkman et al. | 455/436 |
| 2008/0064361 | A1 * | 3/2008 | Bjork et al. | 455/403 |
| 2008/0268861 | A1 * | 10/2008 | Buracchini et al. | 455/452.1 |

(Continued)

OTHER PUBLICATIONS

Buede, Dennis M. et al, "Convergence in Problem Solving: A prelude to Quantitative Analysis," IEEE Transactions on Systems, Man, and Cybernetics, vol. 23, No. 3, May/Jun. 1993, pp. 746-765.*

(Continued)

*Primary Examiner* — Aniss Chad
*Assistant Examiner* — David M Rogers
(74) *Attorney, Agent, or Firm* — Hayes Soloway PC

(57) ABSTRACT

The present invention provides a system and method for an online optimization for a non-linear cognitive wireless. The optimization is achieved by using qualitative model on the system which provides information in the form of monotonic influence diagram. The influence graph represents the state (control variables, goal variables and intermediate variables) and their dependency information using a graphical model incorporating monotonicities information. The present invention also incorporates learning features to build a compact history for reducing bad configurations online. The invention also provides a control engine which achieves the near optimum control of the cognitive wireless network by using the network state information along with the qualitative model.

10 Claims, 5 Drawing Sheets

(56) References Cited

U.S. PATENT DOCUMENTS

2010/0248643 A1* 9/2010 Aaron et al. ............... 455/68
2011/0081897 A1* 4/2011 Beattie et al. ............. 455/418

OTHER PUBLICATIONS

Balamuralidhar, P., "Signed Graph Based Approach for On-Line Optimization in Cognitive Networks," Third International Conference on Communication Systems and Networks (COMSNETS), Jan. 4-8, 2011, 4 pages.*

M. Qiu, et al, "Efficent algorithm of energy minimization for heterogeneous wireless sensor network." In Embedded and Ubiquitous Computing, 2006, pp. 25-34.*

F. Paulisch, et al., "EDGE: An Extendible Graph Editor," Software Practices and Experience, vol. 20, No. S1, 1990, pp. S63-S88.*

W. Sadiq, et al., "Applying graph reduction techniques for identifying structural conflicts in process models." Advanced Information Systems Engineering, 1999, pp. 195-209.*

P. Balamuralidhar, et al.,"A Context Driven Architecture for Cognitive Radio Nodes," Wireless Personal Communications, vol. 45, No. 3, 2008, pp. 423-434.*

* cited by examiner

DYNAMIC SELF CONFIGURATION ENGINE FOR COGNITIVE NETWORKS AND NETWORKED DEVICES

FIELD OF THE INVENTION

The present invention relates to an optimization of a non-linear dynamic network. More particularly, the invention relates to the online optimization of the non-linear cognitive wireless network.

BACKGROUND OF THE INVENTION

The complexity of modern wireless networks exceeds the ability of users and operators to optimally configure them. Autonomic capability is much of a necessity than desire and a viable solution to incorporate greater degrees of intelligence within the network itself. Exploitation of the Cognitive networking paradigm is an approach towards imparting autonomic capabilities to network elements. Cognitive networks are formed when a collection of communication nodes organize to achieve network-level goals with the aid of some form of local cognitive processing. It will involve important aspects such as radio resource management, network management, services delivery and secure configuration mechanisms.

One of the ways to improve the performance of a generic optimum solution search process is to incorporate an awareness of problem semantics into the algorithm. A typical optimization problem consists of the maximization or minimization of an objective function, expressed in terms of a set of variables with their respective domains, subject to a set of constraints. But, this does not include any domain specific concepts or facts. Use of domain ontology in the solution process could make it more efficient.

In general, optimization problems involved in wireless networks which are nonlinear. Many of the cause-effect relations involved are analytically in-tractable. Many of the traditional non-linear optimization algorithms are not suitable for on-line optimization due to their computational complexity and the requirement of a system model. Alternately algorithms following a black box approach such as genetic algorithms, simulated annealing, etc could be explored. However, they do not assure global optimality and do not use problem semantics to improve the solution search process.

Cognitive engine following a cognitive cycle has been proposed in literature for intelligent management of wireless communication links and networks. The cognitive engine is a computational module (software/hardware) that may sit at a terminal, base station or other network elements. The cognitive cycle involves steps such as sensing, analyzing, planning and acting along with learning in a dynamic environment. This engine supports autonomic behavior of the network such as self-configuration, self-optimization, self-healing etc.

Creating a dynamic model of the system is essential for imparting intelligent adaptive control of the system. This is generally done through analytic models, computational models, probabilistic models, rules etc. A suitable learning mechanism needs to be there to update the knowledge base.

For complex dynamic systems such as wireless networks, a complete and accurate model of the system is difficult and analytically in-tractable. A high resolution model that is not accurate may give good performance in certain situations but severely degraded in other cases. On the contrary a low resolution model that is accurate performance but more robust. Machine learning techniques can be used to improve the quality and accuracy of the model.

An online control approach directly experiments the system for a better configuration in the absence of a guiding model. In this approach there is a danger that the system may get into highly degraded performance levels or unacceptable operating points. However if there is a learning mechanism incorporated, the system can avoid such bad operating points/configurations in future. Further the use of a knowledge base that qualitatively model the system behavior can help in reducing the number of iterations.

An online control approach supported with a low resolution model and a learning mechanism would be a good option for cognitive engine for the intelligent and robust control of dynamic systems where high resolution accurate models are infeasible.

One or the other prior art provides a radio network management system which comprises at least one centralized node. The centralized node includes a radio transceiver having more than one adjustable parameter. The centralized node also includes at least one adaptive tuning engine configured to make changes to the at least one adjustable parameter. A weighted analysis function is configured to provide a weighted analysis based on the output of the at least one adaptive tuning engine. Further, a cognitive learning function is configured to provide feedback to make optimally directed adjustments to the at least one adaptive tuning engine.

Also, genetic algorithm (GA) approach is used to adapt a wireless radio to a changing environment. A cognitive radio engine implements three algorithms; a wireless channel genetic algorithm (WCGA), a cognitive system monitor (CSM) and a wireless system genetic algorithm (WSGA). A chaotic search with controllable boundaries allows the cognitive radio engine to seek out and discover unique solutions efficiently.

Some of the lacunae that exists in the prior art discussed above are that, firstly they discloses systems and methods that are not suitable for on-line optimization due to their computational complexity and the requirement of a system model. Some others treat the system as a black box and convergence of such approaches are slow with an element of uncertainty. There is a possibility of a grey box approach which is a middle path that exploits knowledge from an expert to guide through the optimization process more efficiently.

Therefore, there is a need of a system and method which is capable of providing a near optimum configuration for wireless networks by exploiting the qualitative knowledge of an expert on the system at a low complexity. The system and method should be capable of enabling reconfiguration of the network by controlling the network parameters while reducing the complexity.

OBJECTS OF THE INVENTION

It is the primary object of the invention to provide a system and method for an online optimization of a cognitive wireless network and networked devices exploiting qualitative information provided by one or more human expert about the network behavior.

It is another object of the invention to provide a system and method for controlling and reconfiguration of the cognitive wireless network.

It is another object of the invention to provide a system and method for building knowledge base on the dynamics of the system that can be easily captured from experts for enhancing the optimization of the cognitive wireless network.

It is yet another object of the invention to provide a system and method for determination of action and cognition resulting in controlled cognitive wireless network.

SUMMARY OF THE INVENTION

The present invention discloses a system for providing an online optimization for a cognitive wireless network. The said network is having a qualitative model of the system dynamics. The system comprises of an input means configured to capture network state information from the qualitative model of the system dynamics. The network state information comprises of a plurality of state variables. The system further comprises of a control engine configured to analyze each state variable along with the network state and the qualitative model for determination of action and cognition resulting in a controlled cognitive wireless network. The control engine further comprises of an evaluation module configured to cumulatively build a compact history for each bad configuration for enhanced cognition to achieve a stated goal. The control engine further comprises of an optimization module adapted to achieve an optimum control configuration of the cognitive wireless network by using the network state information The system further comprises of an output means configured to generate one or more control parameters to achieve the goal variable.

The present invention also discloses a method for providing an online optimization for a cognitive wireless network by using a qualitative model. The method further comprises of steps of capturing network state information comprising a plurality of state variables from the qualitative model, analyzing the each state variable for determination of action and cognition for controlling the cognitive wireless network. The analysis further comprises of building a compact history for each encountered bad configuration for enhanced cognition to achieve a goal variable associated with the state variable and achieving an optimum control of the cognitive wireless network by using the network state information. The method further comprises of generating one or more control parameters to achieve the goal variable.

DETAILED DESCRIPTION OF THE INVENTION

Some embodiments of this invention, illustrating its features, will now be discussed: The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

The present invention provides a system and method for an online optimization of a cognitive wireless network. The wireless network is further provided with a qualitative model of the system dynamics. The qualitative model of the system dynamics is a source of one or more influences associated with the state variables and identifies a goal variable, control variable and an intermediate variable associated with the state variable state. The state variable is further processed in order to determine an action and cognition resulting in a controlled cognitive wireless network. The state variables are further analyzed to generate one or more control parameters to provide the optimization of the cognitive wireless network.

Figure 1:
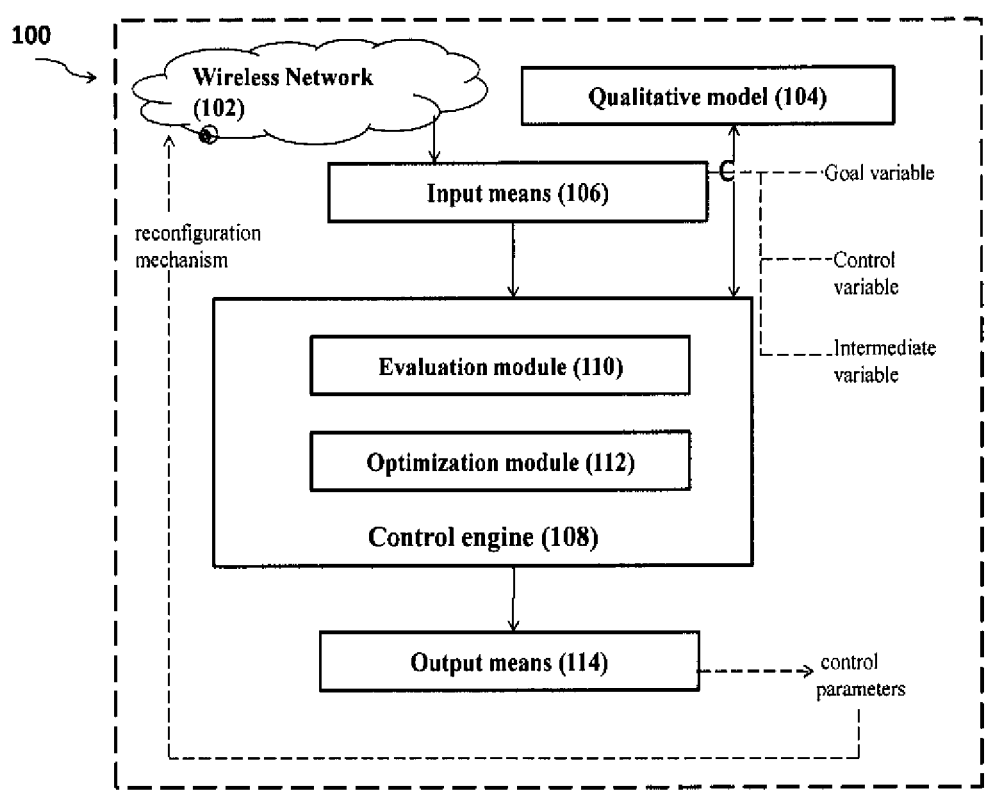
FIG. 1 illustrates the system architecture in accordance with an embodiment of the invention.
Figure 2:
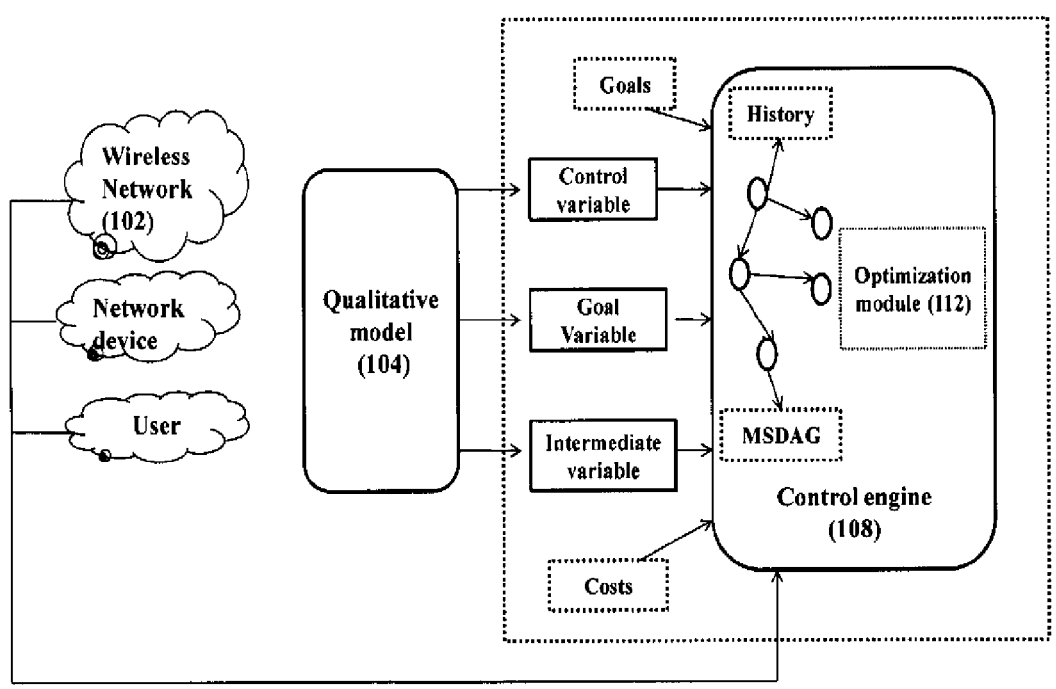
FIG. 2 illustrates the mechanism of optimization of the cognitive wireless network in accordance with an alternate embodiment of the invention.

In accordance with an embodiment, referring to FIG. 1, the system (100) comprises of at least one cognitive wireless network (102) having the qualitative model (104) of the system dynamics. The system (100) further comprises of an input means (106) configured to capture network state information which is included in the qualitative model (104). The network state information includes information about the cognitive wireless network (102), users and networked devices as shown in FIG. 2. The system (100) further comprises of a control engine (108) and an output means (114) for providing the online optimization of the cognitive wireless network (102).

The network state information further comprises of a state variable having a predefined constraint and a plurality of influences. The influence may be a positive influence or a negative influence.

The network information is in a form of an influence diagram which is provided by the qualitative model (104). This influence diagram is monotonic in nature. Monotonic Influence Diagram (MID) consists of nodes and arcs which represent the control variable and the goal variable and their relationship. The arcs in the MID embody qualitative monotonic information for the relation between the variables. These monotonicities indicate whether two dependent variables vary in same or opposite direction. The edges connecting the variable nodes will be directed based on the direction of dependency (causal relationship). The edges will be signed + (positive) if the dependent variables vary in the same direction. Otherwise it will be signed − (negative). The resultant graph is referred as Monotonic Signed Directional Acyclic Graph (MSDAG). The influence diagrams thus prepared by a human expert can be used as the qualitative model (104) that help in representing information about the wireless network by providing relation among various variables.

In accordance with a method embodiment, the above said MSDAG information can be used for qualitative and mathematical functional reasoning about relationships between variables in a design problem in order to solve or facilitate the solution of the problem at the relational, functional or numerical levels. Moreover, MSDAG's can be used to detect critical constraints to simplify the model by reducing its dimensionality or detect flaws in the problem formulation.

The control engine (108) further comprises of an analysis module (not shown in figure) configured to enable conditioning of the network state information such as filtering, denoising etc. The analysis module can simplify the MSDAG by removing superfluous nodes (pruning). The analysis module also identifies one or more conflicting variables associated with the state variable.

In accordance with an embodiment on wireless communications, the goal variable includes but is not limited to bit throughput, latency, power consumption etc. The control variable includes but is not limited to frequency channel, modulation index, coding rate, transmit power, number of slots etc. The intermediate variables are those appear in the paths between control and goal variables which include but are not limited to burst rate, bit error rate, frame error rate etc.

The goal variable indicates the benefits that are expressed as a utility function which will be based on application, and user context. An appropriate utility function need to be selected as a measure of appropriateness of a selected configuration with respect to the targets set by user and applications.

The analyses module further involves an identification of conflicting and non-conflicting variables present in the control variable.

In accordance with an embodiment, by way of a specific example, the optimization problem is considered by the control engine (108) as formulated as tuple<U;D;Y;C;G> such that:

$U=\{u_1; \ldots; u_m\}$ is the set of control (input) variables;

$D=\{d_1; \ldots; d_m\}$ is a set of domains of the variables, each given as a finite ordered set of possible values. These values can include categories.

Let $Y=\{y_1; \ldots; y_k\}$ is a set of intermediate (hidden) variables which are computable or measurable from the system and are dependent on subset of U and or Y.

$C=\{c_1; \ldots; c_p\}$ is a set of linear constraints over U and or Y,

G=(V,E) is a dependency graph over U, Y and Z with edges having + or − signs based on the direction of influence of independent variable on the dependent variable) ($\delta_{i,j}$).

$Z=f(z_1, \ldots; z_n)$ is a goal or utility function to be either minimized or maximized.

The methodology for the formulation and operation of the self optimization functionality is explained below.

In accordance with a method embodiment, the control engine (108) applies the MSDAG based sequential algorithm (MSDAG-SOPT) for optimization of the cognitive wireless network, wherein the MSDAG-SOPT algorithm is formulated as sequential optimization algorithm guided by the monotonicities principles.

In accordance with an embodiment, the method for optimization of the cognitive wireless network include following steps:
 1. The monotonic influence diagram (MID) is prepared corresponding to the wireless network (102). This will involve identification of all control variables U, goal variables Z and intermediate variables Y that are included in the influence paths {P} from control variables to goal variable(s). The domain of the control variables are ordered such that the influences can be monotonic.
 2. Analyze and Simplify the graph by using following rules/guidelines:
    a. Remove nodes and edges corresponding to constants and pre-assigned variables.
    b. Remove all nodes in a path that do not have any associated constraints, and has no branching. Join the predecessor and successor of removed node with an edge having the sign that is same as the path sign $\delta_{i,j}$ between those two nodes (in the earlier graph). (In other words the path sign is not changed due to the deletion of this node).
 3. In the next step, analyze the graph and identify conflicting and non conflicting control variables and their respective paths.
 4. For the paths corresponding to conflicting control variables, identify at least one node that has non-conflicting relationship with control variable and the goal variable. Assign a simple constraint on this variable so that it can be considered as an active constraint. Typically an operating range (upper and lower bound) for this variable would be appropriate.
    Let $v_b = <b_l, b_u>$ be the bounding constraints specified for a critical variable v in the path of U.
 5. Apply the MSDAG based sequential algorithm (MSDAG-SOPT) for optimization.

First the non-conflicting control variables are taken up and perform a hill climbing subject to the constraints by the control engine (108). Subsequently conflicting variables are considered in which hill climbing is used with a guided choice of solution for each iteration is done by the control engine (108) based on the active constraints identified.

By way of a specific example, the steps for applying MSDAG-SOPT algorithm are explained below:

1. Select an initial assignment for the control variables Ui = $U_0$, and objective function Z = $Z_0$
2. Assign a sign for the goal variable Z, $\delta_z$ is + for maximization, − for minimization.
3. Select the non conflicting control variables $U_x \in U$
    a. For each non conflicting variable u in Ux,
        i. Set u* = u+ , the next higher (lower u−) value for u if $\delta_{uz}$ * $\delta_z$ is positive (negative).
        ii. Update the system and evaluate the goal function $\hat{Z}$.
        iii. If sign($\hat{Z} - Z_0$) == $\delta_z$ then
            Update u with u*,
            $Z_0 = \hat{Z}$,
            Repeat Step i.
            Else, Update u with u (t − 1) - reset to previous value,
            Repeat Step a. (Proceed with next variable)
4. For each conflicting variable u in $U_c \in U$
    a. i. For each path $P_i$ corresponding to u
        ii. If $P_i$ has a hidden variable a with a bound $<b_l, b_u>$ then
            If a > $b_u$ then set d = $\delta_{u,a}$ (path gain from u to a)
            else if a < $b_l$ set d = $-\delta_{u,a}$
            else choose a random d ( 1 or −1).
        iii. Apply and observe change in goal function $\Delta Z$. Set d = $\delta_z$ * sign($\Delta Z$)
        iv. Move u to u* in the direction of d. If the limit is reached then abort
        v. Apply u* and note the change in goal function $\Delta Z$.
        vi. If sign(Z) * sign($\Delta Z$) is +ve and | $\Delta Z$| > threshold then repeat step iv.
    b. Repeat step a for next control variable u 5. Repeat the step through 3 till no further improvement in Z. In accordance with a method embodiment, the network state information thus provided by the qualitative model (104) is used to update the control engine (108). The control engine (108) also incorporates a learning feature for building the bad configuration history which is stored as a compact history. At the heart of the control engine (108), an optimization algorithm based on MSDAG is operating on the network state information as shown in FIG. 2. The state variables incorporated in the control engine (108) includes the state of the wireless network and the user. The control engine (108) captures a knowledge base available on the cognitive wireless network including dynamic behavior (not shown in the figure), constraints, costs associated with reconfiguration etc.

Based on the monotonic properties of dependent variables, some heuristics can be formulated to drive the optimization of the wireless network by the control engine (108). The control engine (108) considers a sequential optimization algorithm by changing only one control variable at a time. For non-conflicting control variables with respect to the goal variable, the control can be pushed in the desired direction till a related constraint is met by the control engine. For a conflicting variable there are multiple paths to the goal variable which have net path gains with mixed signs (as shown in FIG. 2). The approach that can be taken by the control engine (108) is similar to the concept of balancing the sign graphs. One way to do this by the control engine (108) is to eliminate (or reduce the influence) of any edges in the undesired path. This could be enabled with the presence of a conflict free control variable in that path (if present). Alternately an active constraint on that path could guide the movement of the conflicting variable.

The control engine (108) is further configured to analyze each state variable and determines action and cognition by varying the control variable with respect to the goal variable. This action and cognition further results in a controlled cognitive wireless network.

The control engine (108) further comprises of an evaluation module (110) configured to evaluate the current configuration and build a case based history for each bad configuration encountered. This compact history is further stored in a storage device (not shown in figure) and is used for avoiding similar bad configurations in future. The compact history is built by using a problem semantic approach which enables a solution search process in the system (100).

The control engine (108) further comprises of an optimization module (112) configured to achieve optimum an optimum control configuration of the cognitive wireless network by using the network state information. The optimization module (112) further identifies at least one node having a non-conflicting relation with a control variable and the goal variable. The control variable and the goal variable are associated with the state variable. This node helps in providing the optimization.

The system (100) further comprises of an output means (114) configured to generate one or more control parameters to achieve the goal variable. These control parameters are further used for reconfiguring the cognitive wireless network.

In accordance with an embodiment, the input means may interface with a plurality of cross layer ports provided by a protocol stack in order to collect state measurements of the system (100). Output means may interface with a plurality of control or configuration ports of the protocol stack.

The system (100) is also capable of providing a pre-diagnosis towards the occurrence of any fault in the cognitive wireless network.

BEST MODE/EXAMPLE FOR WORKING OF THE INVENTION

The invention is described in the example given below which is provided only to illustrate the invention and therefore should not be construed to limit the scope of the invention.

The proposed method of using the MSDAG towards dynamic on-line wireless network optimization by the control engine is illustrated through an example link optimization problem. Further, the methodology could be extended to cover the end-to-end aspects of a networked device, in which case the MSDAG can be expanded to cover the dependencies of a larger set of variables encompassing network, device, applications and user contexts.

Figure 3:
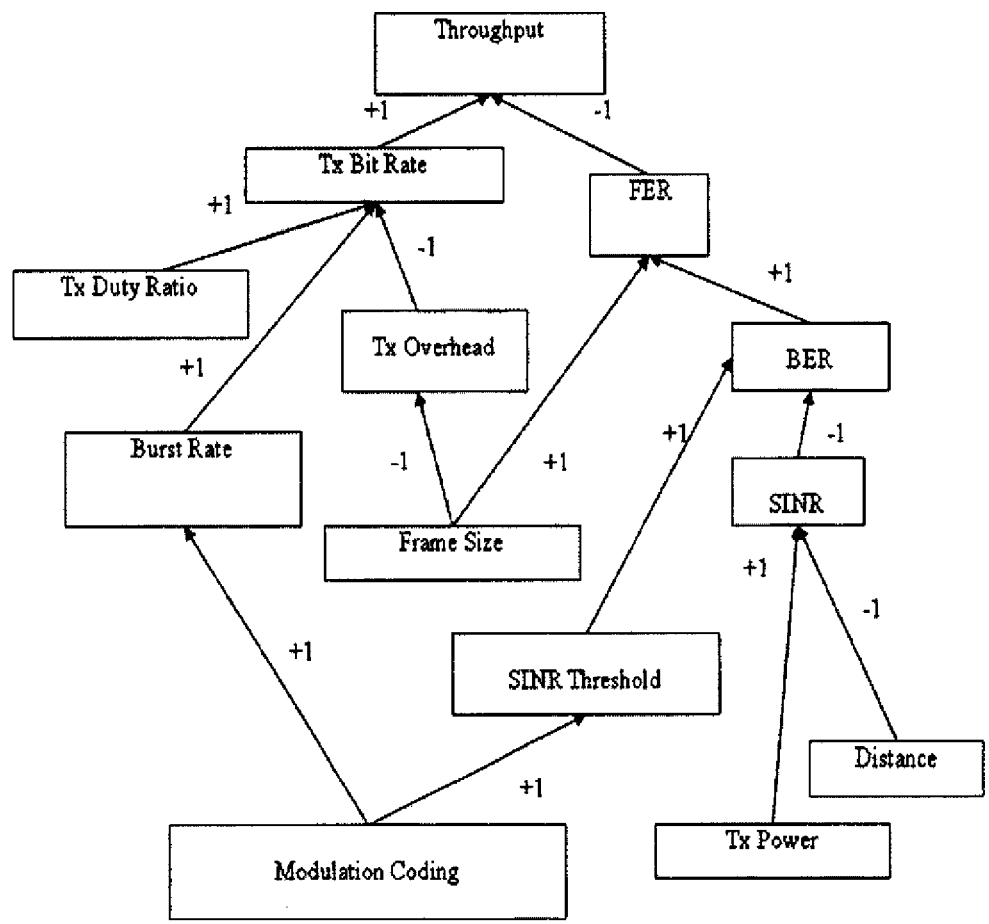
FIG. 3 illustrates SDG for a function for link throughput optimization problem according to an exemplary embodiment of the invention.

FIG. 3 illustrates SDG for a function for link throughput optimization problem according to one exemplary embodiment of the invention. In this Signed Directed Graph (SDG), the goal variable is 'Throughput'. The control variables U={'Modulation Coding', TxPower, 'FrameSize'}. There are two other variables {'TxDutyRatio', 'Distance'} which corresponds to the time fraction available for transmission and distance between transmitter and receiver.

A computational model defining the goal function, dependencies between variables, and domains of control variables are listed in below Model of the wireless link. The domains of the control variables are ordered so that their dependent relations are monotonic. The PHY layer parameters and empirical relations used in this example correspond to IEEE 802.16d standard.

Model of the Wireless Link:
Throughput=Tx Frame Rate*Frame Size*(1−FER)
FER=f(BER, Frame Size)→$P_{FER}=1-(1-P_{BER})^{Frame\ Size}$
BER=f(SINRMargin)
BER=1 if SNRMargin<0'
BER=0 if SNRMargin>20
BER=1.0e−'0.5*exp(−1.5316*SNRMargin+ 0.036265*SNRMargin$^2$
SINRMargin=SINR−SINR Threshold
SINRThreshold=f(Modulation, Coding)→ (BPSK_1/2,1),(QPSK_1/2',1.77),(QPSK_3/4,2.238), (16QAM_1/2,3.548),(16QAM_3/4,5.623), (64QAM_2/3,8.943),(64QAM_3/4,10)
SINR=10**((TxPower−(−90))/20.0)*(1/Distance**(2.0))
ModulationCoding={BPSK_1/2,QPSK_1/2,16QAM_ 1/2,QPSK_3/4,16QAM_3/4,64QAM_2/3,64QAM_3/4}
FrameSize={200,400,800,1000,1200,1300,1500,2000}
TxPower={−10,−8,−6,−4,−2, 0,2,4,6,8,10,12,14,16,18,20}
BurstRate=f(Modulation, Coding)→{(BPSK_1/2, 100000),(QPSK_1/2,200000),[(16QAM_1/2,300000), (QPSK_3/4,300000), (16QAM_3/4,450000),(64QAM_2/ 3,533000),(64QAM_3/4,600000)
TxBitRate=f(BurstRate,TxDutyRatio,TxOverhead)→BurstRate*TxDutyRatio*(1−TxOverhead)
TxOverhead=f(TxFrameRate)→TxFrameRate*1e−6
Tx Frame Rate=TxBitRate/FrameSize By examining the corresponding SDAG in the FIG. 2 following observations can be made.

The Objective is to Maximize Throughput=f(Modulation, Tx Power, Frame size)
Subject to BER<10e−4; (BER=f(Modulation, Tx Power) FER<10%; (FER=f(Modulation, Tx power, Frame size))

Figure 4:
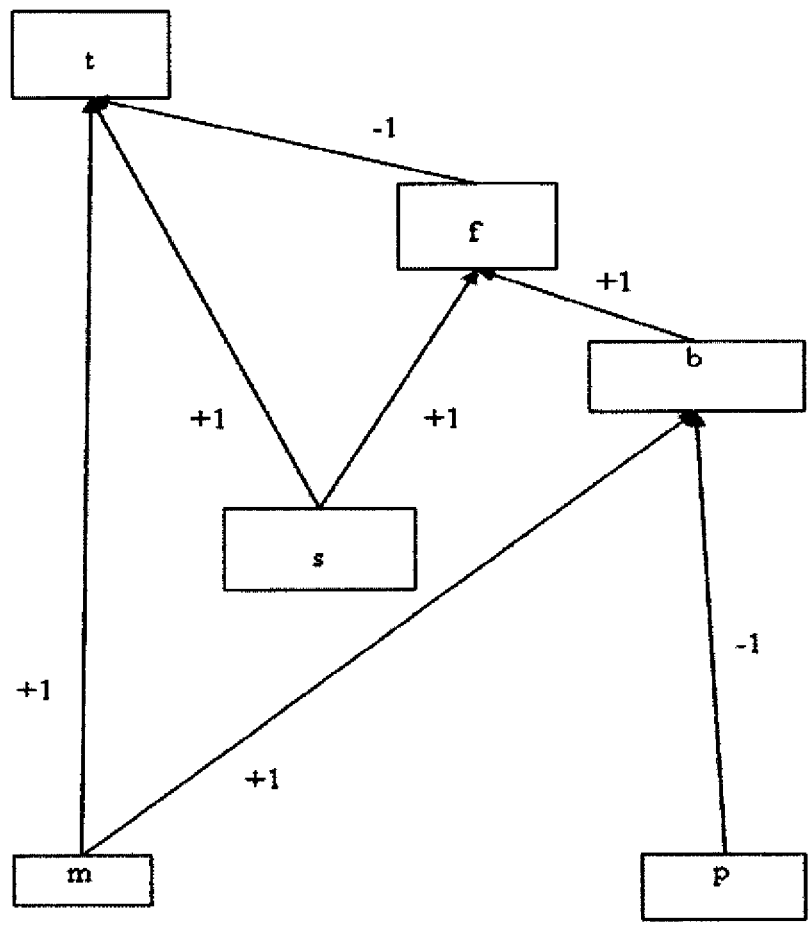
FIG. 4 illustrates an MSDAG corresponding to the link optimization problem according to an exemplary embodiment of the invention.

FIG. 4 illustrates MSDAG corresponding to the link optimization problem according to one exemplary embodiment of the invention. Throughput t is the goal variable. Control variables U={m, p, f} where in stands for Modulation Coding, p stands for Tx Power and s stands for Frame Size. The two variables Tx Duty ratio and Distance are considered to be static for this analysis. This graph has been transformed to an influence graph (as shown in FIG. 4) by keeping only the goal variable, control variables and intermediate variables with constraints. Other intermediate variables are removed and their paths are replaced with an edge having their effective path influence. Effective influence is nothing but the product of signs of individual edges in the path.

Now the optimization problem can be written in the following form:

Maximize t=f(m,p,s),
Subject to $G_1(b)$: b−10e−4<=0,
$G_2(f)$: f−0.1<=0,
$m \in \{m_1, \ldots, m_n\}$; $p \in \{p_1, \ldots, p_k\}$; $s \in \{s_1, \ldots, s_j\}$, where b and f are the bit error rate and frame error rate measurements.

Monotonicity Table Corresponding to the influence graph is shown below in Table 1.

TABLE 1

|   | m | p | s |
|---|---|---|---|
| t | +/− | +/0 | +/− |
| $G_1$(b) | + | − |   |
| $G_2$(f) | + | − | + |

Here it can be seen that the variables m and s has mixed signs in the row corresponding to the objective function t. This means that they are conflicting variables with respect to t. G(b) and G(f) are constraints on B and F. In-turn they can be expressed as $g_1$(m, p) and $g_2$(m, p, f) respectively.

Consider the variable p. According to monotonicity principle the available constraints $G_1$ & $G_2$ are inactive. There are no active constraints for p. One possibility is to activate the default constraint $p \leq p_{pmax}$ (here, all control variables considered are discrete and bounded; p can take value between $p_{min}$ and $p_{max}$ in discrete steps). This means that p can be set at $p_{max}$. However $\delta_{p,t}$ is also has a value 0, which means it is a saturating relation where increase in p saturates the influence on t after a certain value. So another control rule for p can be "increase p till t saturates". Alternately we could add one more constraint such as $G_3$(b): b>10e−10 that can be active for p since it provide a bound from below. In this case the control law for p can be increased p till b satisfies the constraint $G_3$(b) within an acceptable deviation.

Consider the variable m that corresponds to Modulation & coding. The influence table shows that the influence of m on t, $\delta_{m,t}$, is not entirely monotonic since it has two signs. This is because there are two paths from m to t. The one contributing through Tx bit Rate node is +ve in sign and the other path passing through FER is −ve. There are two regions where $\delta_{m,t}$ is + in one and − in other (there are two paths of opposite signs). When $\delta_{m,t}$ is +, from the monotonicity table there are two constraints that can be active $G_1$ and $G_2$. One could choose the nearest constraint in hierarchy, which is $G_1$. Now the control algorithm is to increase m till $G_1$(b)=0.

Here satisfying the constraint with strict equality may not be feasible, however we could consider identification of a transition by hovering around the quality region.

Consider the variable s, corresponding to frame size. This variable also has two paths to the goal variable t with opposite signs. The analysis is similar to that of m. In the positive region the constraint $G_2$ is active. So the control algorithm is to move to the region of + influence, and increase s till $G_2$(f)=0.

Based on the above described methodology, the problem formulation and inputs have been prepared. The optimization control loop has been implemented using python language. We used the distance d between Tx and Rx as an external variable that is changing due to mobility. Modulation Coding, Tx Power, and Frame size are the control variables. Objective is to maximize the Throughput. Simulation experiment was conducted by varying the distance at random to track the optimum throughput computed by the optimization engine 150 as shown in the FIG. 4.

Figure 5:
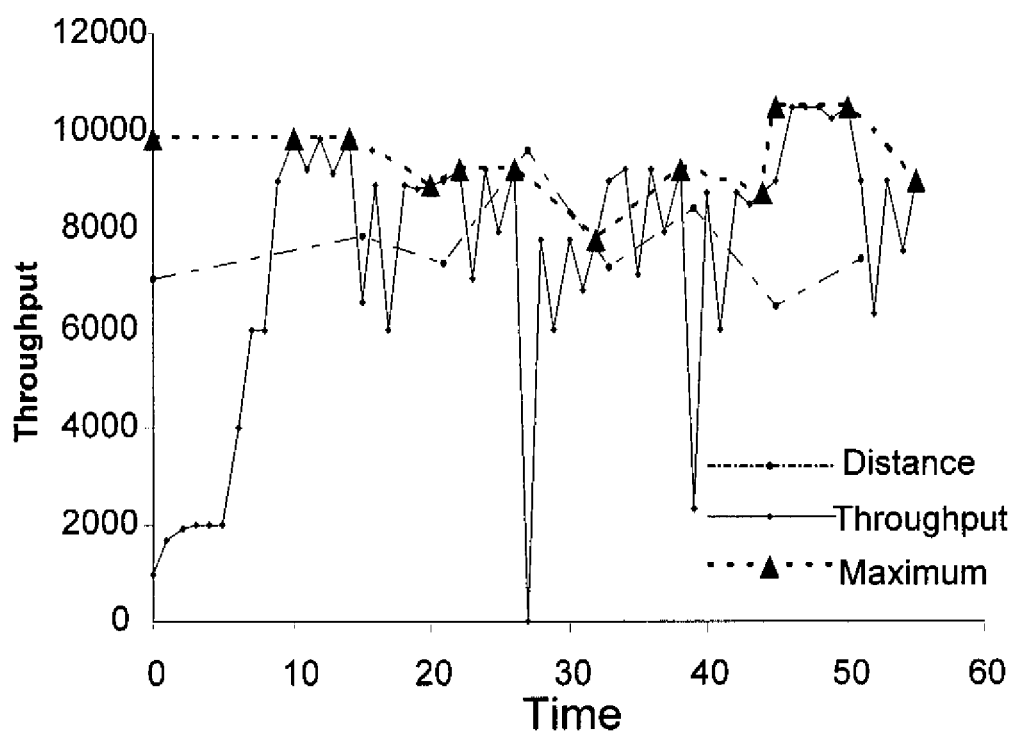
FIG. 5 illustrates the graphical representation for the tracking optimum throughput under mobility according to an exemplary embodiment of the invention.

The optimality of this solution is verified using a standard mixed integer nonlinear solver. The above optimization problem is modeled in AMPL (prior art work). This has validated the optimality of the obtained solution using MSDAG based algorithm. Further computationally we have compared the number of objective function evaluations required by both the algorithms. It has consistently shown that the MSDAG based algorithm required lesser number of evaluations. For a typical case the current algorithm took 12 evaluations where BONMIN (an optimization tool) took 33. Further this has been verified by hand optimization and is shown as the maximal bound in the graph as shown in the FIG. 5.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

I claim:

1. A system for providing an online optimization for a cognitive wireless network using a qualitative model, the system comprising:
    a processor;
    a memory coupled to the processor, wherein the processor executes programmed instructions stored in the memory for:
    capturing network state information comprising a plurality of state variables, driven by the qualitative model;
    identifying, from the plurality of state variables, a goal variable, a plurality of intermediate variables, and a plurality of control variables;
    forming a monotonic signed directional acyclic graph (MSDAG), in form of hierarchy of nodes, comprising the goal variable, the plurality of intermediate variables, and the plurality of control variables represented in form of a plurality of pair of nodes, wherein each pair of nodes is connected via an edge having a monotonic information indicated in form of a +ve sign or a −ve sign;
    simplifying the MSDAG in order to generate a simplified MSDAG, wherein the simplified MSDAG is generated by
    a) removing superfluous nodes corresponding to one or more intermediate variables that does not include a predefined constraint, and
    b) replacing a path associated with the superfluous nodes with an edge having an effective path influence, wherein the effective path influence is a product of the monotonic information of edges forming the path;
    identifying one or more control variables from the plurality of control variables, present in the simplified MSDAG, as conflicting variables and non-conflicting variables, wherein the conflicting variable indicates a control variable having multiple paths to the goal variable;
    assigning an active constraint, to a conflicting control variable having a non-conflicting path with the goal variable, for guiding movement of the conflicting control variable in said path, wherein the active constraint corresponds to a value within an operating range of the network; and optimizing the cognitive wireless network by applying a Monotonic Signed Directional Acyclic-Graph based sequential algorithm (MSDAG-SOPT) on the simplified MSDAG, wherein the MSDAG-SOPT comprises a) selecting a path, of the multiple paths, for the conflicting variables, wherein the path comprises multiple intermediate variables having predefined constraints, b) identifying an intermediate variable, having the active constraint, amongst the multiple intermediate variables, nearest to the control variable in the hierarchy of nodes, wherein the intermediate variable is a conflicting control variable from among the conflicting control variables, and c) updating the one or more control variables based on the monotonic information associated with the path, wherein at least one conflicting control variable identified as conflicting is updated until the predefined constraint associated with the intermediate variable is satisfied.

2. The system as claimed in claim 1, wherein the Qualitative Model is in a form of an influence diagram or a qualitative probabilistic network or a combination thereof.

3. The system as claimed in claim 1, wherein the goal variable is one of a bit error rate, throughput, latency, power consumption, and wherein the plurality of control variables comprise frequency channel, modulation index, coding rate, transmit power, number of slots, and wherein the plurality of intermediate variables comprise burst rate, bit error rate, frame error rate.

4. The system as claimed in claim 1 further comprising a storage means adapted to store compact history indicative of one or more bad configurations pertaining to the cognitive wireless network.

5. The system as claimed in claim 1, wherein the processor further executes a programmed instruction for enabling a pre-diagnosis of one or more fault and reconfiguration mechanism for the cognitive wireless network.

6. The system as claimed in claim 1, wherein the processor further executes a programmed instruction for enabling conditioning of the network state information by filtering or de-noising the network state information.

7. A method for providing an online optimization for a cognitive wireless network using a qualitative model, the method comprising steps of:

capturing, by a processor, network state information comprising a plurality of state variables, driven by the qualitative model;

identifying, from the plurality of state variables, a goal variable, a plurality of intermediate variables, and a plurality of control variables;

forming, by the processor, a monotonic signed directional acyclic graph (MSDAG), in form of hierarchy of nodes, comprising the goal variable, the plurality of intermediate variables, and the plurality of control variables represented in form of a plurality of pair of nodes, wherein each pair of nodes is connected via an edge having a monotonic information indicated in form of a +ve sign or a −ve sign;

simplifying the MSDAG in order to generate a simplified MSDAG, wherein the simplified MSDAG is generated by a) removing superfluous nodes corresponding to one or more intermediate variables that does not include a predefined constraint, and b) replacing a path associated with the superfluous nodes with an edge having an effective path influence, wherein the effective path influence is a product of the monotonic information of edges forming the path;

identifying one or more control variables from the plurality of control variables, present in the simplified MSDAG, as conflicting variables and non-conflicting variables, wherein the conflicting variable indicates a control variable having multiple paths to the goal variable;

assigning an active constraint, to a conflicting control variable having a non-conflicting path with the goal variable, for guiding movement of the conflicting control variable in said path, wherein the active constraint corresponds to a value within an operating range of the network; and optimizing the cognitive wireless network by applying a Monotonic Signed Directional Acyclic Graph based sequential algorithm (MSDAG-SOPT) on the simplified MSDAG, wherein the MSDAG-SOPT comprises a) selecting a path, of the multiple paths, for the conflicting variables, wherein the path comprises multiple intermediate variables having predefined constraints, b) identifying an intermediate variable, having the active constraint, amongst the multiple intermediate variables, nearest to the control variable in the hierarchy of nodes, wherein the intermediate variable is a conflicting control variable from among the conflicting control variables, and c) updating the one or more control variables based on the monotonic information associated with the path, wherein at least one conflicting control variable identified as conflicting is updated until the predefined constraint associated with the intermediate variable is satisfied.

8. The method as claimed in claim 7, wherein the optimization further comprises building a compact history indicative of bad configurations pertaining to the cognitive wireless network.

9. The method as claimed in claim 8 further comprising storing the compact history providing learning knowledge for the bad configurations.

10. The method as claimed in claim 7, wherein the method further comprises of pre-diagnoses of one or more fault and reconfiguration of the cognitive wireless network.

* * * * *